UNITED STATES PATENT OFFICE.

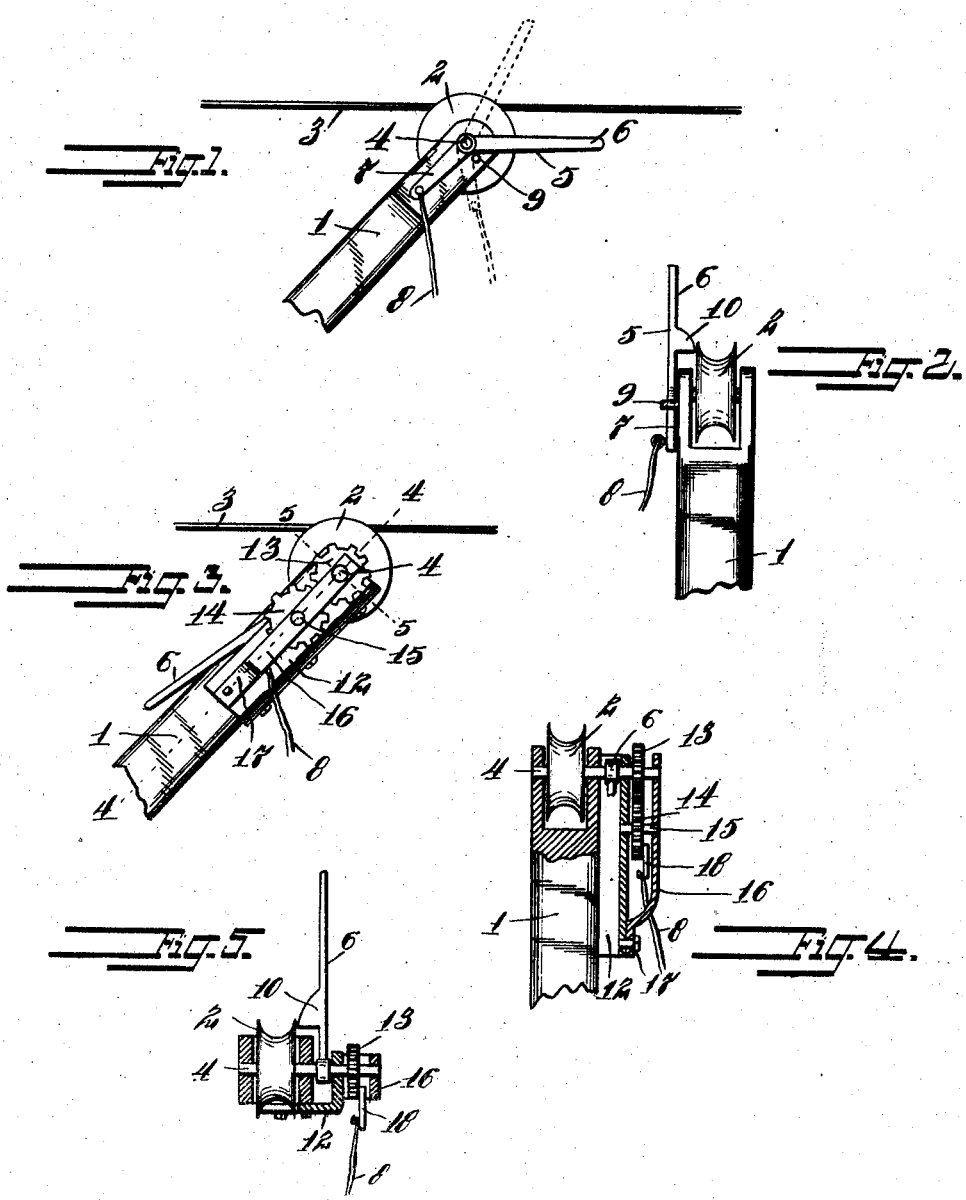

FREDERICK A. SELLEY, OF NASHVILLE, TENNESSEE.

TROLLEY-FINDER.

No. 859,783.   Specification of Letters Patent.   Patented July 9, 1907.

Application filed July 26, 1906. Serial No. 327,870.

*To all whom it may concern:*

Be it known that I, FREDERICK A. SELLEY, a citizen of the United States, residing at Nashville, in the county of Davidson and State of Tennessee, have invented certain new and useful Improvements in Trolley-Finders; and I do declare the following to be a full, clear, and exact description of the invention, such as will enable others skilled in the art to which it appertains to make and use the same.

This invention relates to improvements in trolley finders or guides and consists in the novel construction, combination and arrangement of parts herein-after described and claimed.

The object of the invention is to provide a simple, inexpensive and efficient device which may be readily applied to a trolley pole and easily operated to guide the trolley wheel upon the trolley wire.

The above and other objects which will appear as the nature of the invention is better understood are accomplished by the construction illustrated in the accompanying drawings in which,—

Figure 1 is a side elevation of the improved trolley finder showing it applied to a trolley pole, the device being in its normal position in full lines and in its elevated or operating position in dotted lines; Fig. 2 is an end view of the trolley pole and the finder, the latter being in its elevated or operative position; Fig. 3 is a side elevation of a modified form of the invention; Fig. 4 is a longitudinal sectional view taken on the plane indicated by the line 4—4 in Fig. 3 and Fig. 5 is a transverse sectional view taken on the plane indicated by the line 5—5, Fig. 3.

Referring more particularly to Figs. 1 and 2 of the drawing, the numeral 1 denotes a portion of a trolley pole which has journaled in its forked upper end the usual grooved trolley wheel 2 adapted to run upon the trolley line or wire 3. The pivot 4 for the wheel 2 is extended upon one side of the pole and has mounted upon it an angular lever 5, said lever has a long arm 6 adapted to serve as a guide or finder for the trolley wire and a short arm 7 to which is connected an operating rope or other flexible connection 8. The lever 5 hangs normally in the position shown in the full lines in Fig. 1 so that its arm 6 is disposed horizontally beneath the plane of the trolley wire 3 and its supports or hangers. It is supported in this position by the engagement of said arm 6 which is heavier than the arm 7, with a stop pin or lug 9 projecting from one side of the trolley pole 1. Said stop lug 9 is also engaged by the arm 7 when the rope 8 is drawn upon to swing the arm 6 to its elevated or operative position, shown in dotted lines in Fig. 1. When in this position which is also shown in Fig. 2, the arm 6 extends vertically and is adapted to guide the trolley wire into the groove of the trolley wheel. In order to facilitate this an inclined lug or cam 10 is formed upon the inner face of the arm 7, just above the upper end of the trolley pole, as clearly shown in Fig. 2.

When it is desired to engage the trolley wheel with the wire 3, the rope 8 is drawn upon to swing the arm 6 to a vertical position and the pole is then swung laterally until the trolley wire engages it. The pole is then pulled down to allow the wire to pass up over its smooth or unobstructed side and to drop into the groove wheel 2 or to engage the arm 6 which latter will guide it down into the wheel when the pole is allowed to swing upward. When the rope 8 is raised the finder will drop to its normal position, as shown in full lines of Fig. 1. It will be seen that this device permits the trolley wheel to be quickly and easily engaged with the wire by simply swinging the pole when elevated, until it engages the wire and then lowering it until it drops into the groove of the wheel.

In Figs. 3, 4 and 5, I have shown another way in which the finder arm or lever may be operated. In this embodiment of the invention the arm or lever 6 is fastened to the axle or shaft 4 of the trolley wheel and is adapted to swing downwardly between the trolley pole and a curved plate 12 which is secured thereto and spaced therefrom. The axle 4 also extends through this plate and has fastened upon it a cog wheel or pinion 13 which meshes with the cog wheel or gear 14 secured upon a shaft 15 mounted in the plate 12 and in a longitudinally extending plate or strap 16 which has one of its ends secured to the plate 12, as shown at 17, and its other end formed with a bearing for the end of the axle 4. The cog wheel 14 carries an arm or lever 18 which corresponds to the arm 7 and has the operating rope 8 attached to it.

It will be seen that when the wheel 14 is rotated its motion will be imparted to the wheel 13 and hence to the finder arm or lever 6. In all other respects the construction and operations of this embodiment of the invention is the same as that of the one first described.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is;—

In combination with a trolley pole and its wheel, a finder arm on the shaft of said wheel, a cog wheel also on said shaft and spaced from said finder arm, an inner plate connected to the trolley pole, spaced therefrom, having an opening through which the trolley wheel shaft extends, and serving to space said cog wheel from said finder rod, an outer plate on the inner plate having its outer portion spaced therefrom and having a bearing for the trolley wheel shaft, a cog wheel having its shaft mounted in bearings in the inner and outer plates and engaging the first-mentioned cog wheel, and a lever arm attached to the last-mentioned cog wheel, and an operating rod attached to said lever arm.

In testimony whereof I have hereunto set my hand in presence of two subscribing witnesses.

FREDERICK A. SELLEY.

Witnesses:
EVERETT GRIFFITH,
EDGAR DRAKE.